(12) United States Patent
Detlef

(10) Patent No.: US 6,351,523 B1
(45) Date of Patent: Feb. 26, 2002

(54) METHOD AND APPARATUS FOR MANAGEMENT OF EMAIL ORIGINATED BY THIN CLIENT DEVICES

(75) Inventor: Michael John Detlef, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/273,704

(22) Filed: Mar. 22, 1999

(51) Int. Cl.[7] .............................................. H04M 3/533
(52) U.S. Cl. ................................ 379/88.14; 379/88.17; 455/412
(58) Field of Search ............................... 379/62.1, 88.13, 379/88.14, 88.17, 88.18, 88.22, 93.01, 93.24; 455/412, 413, 414; 709/206, 207

(56) References Cited

U.S. PATENT DOCUMENTS

| | | | |
|---|---|---|---|
| 4,837,798 A | | 6/1989 | Cohen et al. |
| 5,136,291 A | | 8/1992 | Teague |
| 5,187,735 A | | 2/1993 | Herrero Garcia et al. |
| 5,479,411 A | | 12/1995 | Klein |
| 5,557,659 A | | 9/1996 | Hyde-Thomson |
| 5,608,786 A | | 3/1997 | Gordon |
| 5,619,684 A | | 4/1997 | Goodwin et al. |
| 5,625,670 A | | 4/1997 | Campana, Jr. et al. |
| 5,717,742 A | | 2/1998 | Hyde-Thomson |
| 5,727,058 A | | 3/1998 | Blumhardt et al. |
| 5,737,395 A | * | 4/1998 | Iribarren ..................... 379/88 |
| 5,987,100 A | * | 11/1999 | Fortman et al. ......... 379/88.14 |
| 6,185,603 B1 | * | 2/2001 | Henderson et al. ......... 709/206 |
| 6,223,213 B1 | * | 4/2001 | Cleron et al. ............... 709/206 |

* cited by examiner

Primary Examiner—Scott L. Weaver
(74) Attorney, Agent, or Firm—Robert D. Varitz, P.C.

(57) ABSTRACT

A system for providing a voice response to an EMail message, wherein the voice response is generated by a thin client device and transmitted to a cellular, or similar, service and then to a world-wide communications network, includes a conversion mechanism co-located with the cellular service for converting the voice response into a voice data file which is transmitted over the world-wide communications network; an EMail server connected to the world-wide communications network for receiving conventional EMail and voice data files; an EMail-to-voicemail gateway for identifying voice data files; a voicemail interface for receiving voice data files from said EMail-to-voicemail gateway and converting said voice data files into voice streams; a voicemail system, including recipient voicemail boxes; for directing said voice streams into a recipient's voicemail box. A method of generating a voicemail message with a thin client device and transmitting that voicemail message over an EMail system, includes sending a voice mail message over a wireless phone system; converting the voice mail message into a voice data file; transmitting a the voice data file over a world-wide communications network; receiving the voice data file at an EMail server; separating the voice data file from EMail files; changing the voice data file into a voice stream; and directing the voice stream to a recipient's voicemail box.

13 Claims, 2 Drawing Sheets

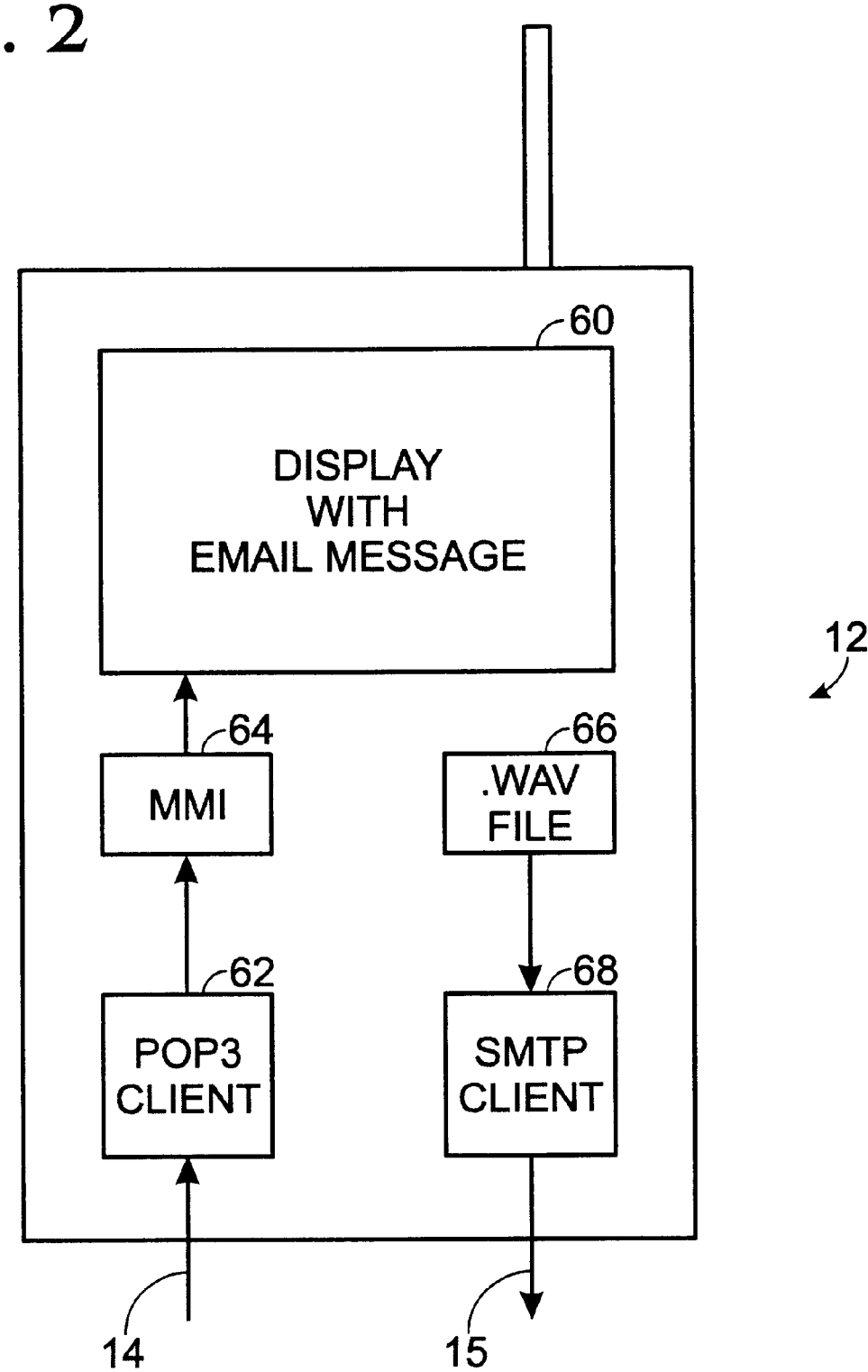

METHOD AND APPARATUS FOR MANAGEMENT OF EMAIL ORIGINATED BY THIN CLIENT DEVICES

FIELD OF THE INVENTION

This invention relates to a combined voicemail/EMail and private branch exchange (PBX) system and method for providing voice response to an EMail message.

BACKGROUND OF THE INVENTION

Hand-held computing devices with integrated telephones have been available for some time. The purpose of these devices is to allow mobile users to perform simple operations, such as sending or receiving EMail, and accessing information services, without carrying a bulky laptop computer. Unfortunately, even though these devices are significantly smaller than the equivalent laptop computer/cellular phone combination, they are too bulky to suit the demands of most users, and have therefore been poorly received in the market. The bulk of these early devices is the perceived requirement of a QWERTY keypad and large, by cellular phone standards, display, usually in the form of a LCD. The developers of these first generation devices believe that these components are necessary in order to support the primary data application: sending and receiving EMail.

In order to appeal to the broader market, it is necessary that these devices support voice and EMail, and that they be equivalent in size and cost to traditional cellular phones. This is not as difficult as it may seem. First, voice operation is a given. Second, one may argue that EMail sent to mobile users is different than that which is sent to fixed-base users in that the length is generally constrained to several sentences, and attachments are not included. This difference in message composition exists because present-day wireless devices, such as alphanumeric pagers, typically are not capable of processing attachments, the relatively small display size limits the amount of text that is displayed at one time, and the scrolling capability is limited by user patience.

Alphanumeric paging and digital cellular (DC)/personal communications system (PCS) operators offer infrastructure-based services which allow conventional EMail, up to several hundred characters in length to be routed to wireless users. The 3–4 line screens, present on many high-end DC and PCS voice phones are large enough to allow perusal of short text messages. The reception of an EMail message by a user of a DC/PCS device may be supported on a conventional voice phone platform, already in place.

The problem arises when a user wishes to reply to a message. Dedicated QWERTY keyboards consume excessive space, handwriting recognition is cumbersome, and requires the use of a stylus which is likely to be misplaced, and reliable voice recognition requires resources which cannot be deployed, given the previously-mentioned size and cost constraints.

Key industry players have indicated that future voicemail/EMail products will support a reply mechanism which allows the recipient to view the text-based EMail and then compose a voice memo in reply. The voice memo is captured by the device and stored as a compressed audio file which is then mailed to the message originator. While this may be one solution to the problem, it may not be a viable business solution to those millions of business users throughout the world who continue to us legacy PCs, i.e., x486-based and older equipment, that will not adequately support audio file presentation. For this scheme to work, the recipient must have access to a multimedia-capable PC in order to playback the reply. Furthermore, most cubicle-resident business users would prefer not to have sensitive EMail "broadcast" to co-workers who happen to be listening nearby. Neither is the problem solved in the case where a user polls EMail with a DC/PCS device having limited display, and no capability to play a voice file.

The majority of the voice-related EMail prior art is in the field of voice transmission over the internet, using internet protocol (IP). The prior art disclosed various gateways which offer the inverse to the invention described herein, namely, the conversion of voice-to-data in preparation for real-time transmission across an IP network.

U.S. Pat. No. 5,727,058, to Blumhardt et al., granted Mar. 10, 1998 for Apparatus and method for routing communications to a variety of CPE [Customer Premises Equipment] devices, uses a database in the switch to route various call types, voice, fax, data, etc., to the proper type of CPE.

U.S. Pat. No. 5,717,742, to Hyde-Thomson, granted Feb. 10, 1998, for Electronic mail system having integrated voice messages, describes a unified in box which allows presentation of voicemail and EMail messages in a consolidated summary "screen".

U.S. Pat. No. 5,625,670, to Campana et al., for Electronic mail system with RF communications to mobile processors, describes an EMail system using RF information transport for at least one portion of the overall communication link.

U.S. Pat. No. 5,619,684, to Goodwin et al., granted Apr. 8, 1997, for Method and apparatus for consistent user interface in a multiple application personal communications device, describes a MMI for a PMC type of device which maintains a consistent look-and-feel independent of the communication link, wired or wireless, in use.

U.S. Pat. No. 5,608,786, to Gordon, granted Mar. 4, 1997, for Unified messaging system and method, describes a unified in box system which uses a data network such, as the internet, for intermediate legs.

U.S. Pat. No. 5,557,659, to Hyde-Thomson, granted Sep. 17, 1996, for Electronic mail system having integrated voice messages, describes an integrated EMail system which accepts analog voice input from public switched telephone network (PSTN) interface and converts it to text format.

U.S. Pat. No. 5,479,411, to Klein, granted Dec. 26, 1995, for Multimedia integrated message arrangement, uses text-to-speech processing to convert text-based EMail to an audio representation which is routed to a voicemail system.

U.S. Pat. No. 5,187,735, to Herrero Garcia et al., granted Feb. 16, 1993, for Integrated voice-mail based voice and information processing system, describes a system for processing real-time inbound analog voice calls only.

U.S. Pat. No. 5,136,291, to Teague, granted Apr. 4, 1992, for Transmitting binary data files using electronic mail, describes a compression method using base-85 compression protocol.

U.S. Pat. No. 4,837,798, to Cohen et al., granted Jun. 6, 1989, for Communication system having unified messaging, describes a unified in box system wherein the user must designate the type of retrieval device in use, phone, terminal, etc. A server then formats all messages destined to appear on a specified device.

SUMMARY OF THE INVENTION

A system for providing a voice response to an EMail message, wherein the voice response is generated by a thin client device and transmitted to a cellular, or similar, service and then to a world-wide communications network, includes a conversion mechanism co-located with the cellular service for converting the voice response into a voice data file which is transmitted over the world-wide communications network; an EMail server connected to the world-wide communications network for receiving conventional EMail and voice data files; an EMail-to-voicemail gateway for identifying voice data files; a voicemail interface for receiving voice data files from said EMail-to-voicemail gateway and converting said voice data files into voice streams; a voicemail system, including recipient voicemail boxes; for directing said voice streams into a recipient's voicemail box.

A method of generating a voicemail message with a thin client device and transmitting that voicemail message over an EMail system, includes sending a voice mail message over a wireless phone system; converting the voice mail message into a voice data file; transmitting a the voice data file over a world-wide communications network; receiving the voice data file at an EMail server; separating the voice data file from EMail files; changing the voice data file into a voice stream; and directing the voice stream to a recipient's voicemail box.

An object of the invention is to provide a mechanism by which audio EMail replies may be forwarded to a recipient's voicemail box for convenient manipulation.

Another object of the invention is to provide a system and method for providing replies to EMail messages over a world-wide communications network.

A further object of the invention is to provide a system and method for providing replies to EMail messages over a world-wide communications network using portions of existing infrastructure.

Another object of the invention is to provide a system and method for providing replies to EMail messages over a world-wide communications network using existing thin client devices.

These and other objects and advantages of the invention will become more fully apparent as the description which follows is read in conjunction with the drawing.

BRIEF DESCRIPTION OF THE DRAWING

FIG. 2 is a block diagram of the thin client device of the invention.

DETAILED DESCRIPTION OF THE PREFERRED EMBODIMENT

Figure 1:
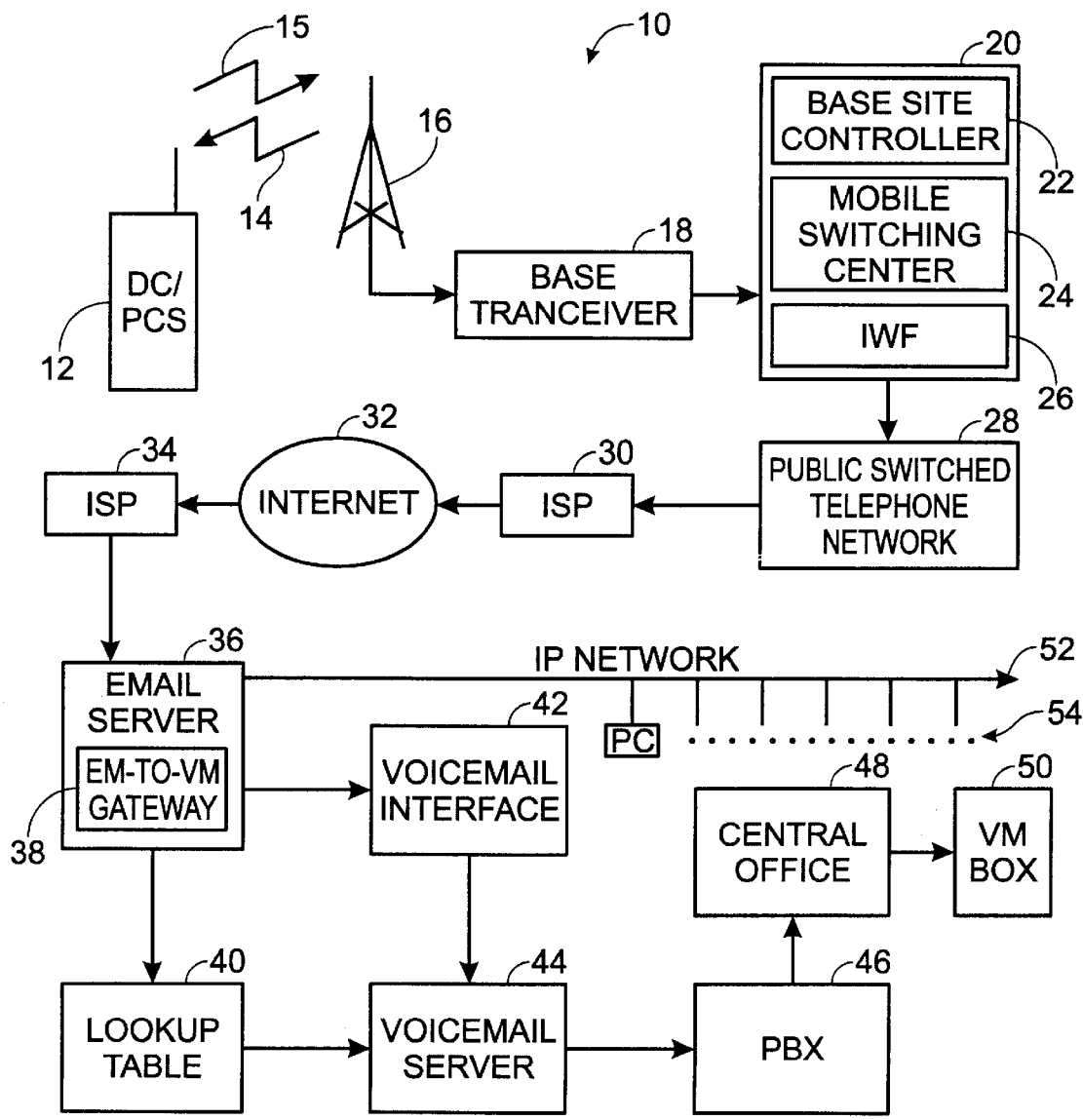
FIG. 1 is a block diagram of the system of the invention.

The invention is an EMail-to-voicemail gateway. This invention is infrastructure/server-based. However, the overall system relies upon the existence of client devices which allow the user to: originate and/or reply to EMail by selecting the recipient through conventional means, such as directory look-up, etc.; create a voice memo which is encoded using a defacto standard method; attach the encoded voice memo to an EMail message; and mail the EMail message to the intended recipient. The invention is a server-based hardware/software system which identifies attached audio files on inbound EMail and diverts the audio portion to an associated voicemail box. The recipient may then review the EMail reply in privacy using the existing voicemail message manipulation facilities.

The invention provides a low cost system and method which preserves the small form factor of a traditional cellular phone. In fact, a number of cellular phones and most PDAs, also referred to herein as "thin client devices,"

already offer a stand-alone voice memo function. The processing power required to convert captured audio into one of the common audio distribution file formats is minimal. Portable devices exist in the market today which contain all of the hardware elements necessary to perform this operation.

The system of the invention includes the following components:

(1) an EMail server, such as simple mail transfer protocol (SMTP), for sending mail, and post office protocol 3 (POP3) for receiving mail;

(2) an attachment processing mechanism which copies and decodes attached audio files;

(3) a database which links EMail recipient identification with voicemail box address; and (4) a hardware interface to access the voicemail system and load decoded audio messages into specific voicemail box addresses.

Referring now to FIG. 1, the system of the invention is depicted generally at 10. System 10 includes a DC/PCS, or other thin client device, 12 which, for purposes of this invention, receives EMail message signals 14 from an antenna 16, and transmits voice reply signals 15 to such messages to antenna 16. Antenna 16 is connected to a base transceiver 18, which in turn is connected to a cellular processing system 20. As this disclosure is concerned with the generation of a voice signal from device 12 which will ultimately appear in a recipient's voicemail box, signal flow is shown in one direction only.

Cellular processing system 20 includes the conventional base site controller 22, a mobile switch center 24 and an inter-working function (IWF) 26. Voice reply signal 15 is sent by a user of device 12 in response to a received EMail message that the user viewed on a display screen of device 12. As the voice message is a reply to an EMail message, the EMail address of the original sender, soon-to-be recipient, is known to device 12. Voice reply signal 15 includes an EMail reply directed to the original sender, and a voice message reply, in the form of an attachment to the reply EMail generated by device 12.

System 20 is connected to a public switched telephone network (PSTN) 28, which is connected, possibly through an internet service provider (ISP) 30, to a world-wide communications network known as the internet 32. Internet 32 connects to a receiving ISP 34, which provides service to an EMail server 36, probably located at a business location. EMail server 36 includes therein an EMail-to-voicemail gateway 38, which distinguishes conventional EMail messages from those messages generated by device 12 which are intended, ultimately, to reach a recipient's voicemail box. Special purpose EMail-to-voicemail gateway 38 allows EMail messages, with attached voice data files, to be specially processed such that the voice content portion may be converted back to audio and forwarded to the recipient's voicemail box.

A lookup table 40 is provided to link EMail addresses with voicemail box locations. The voice data file, as received in server 36, is separated from the EMail reply, and is transformed into a voice stream by a voicemail interface 42, transmitted to the voicemail system 44 and then to a PBX 46. Lookup table 40 contains a list of EMail addresses for company personnel and voice mail box addresses associated with each person. This provides a direction for the voice mail message that has been separated from the EMail reply. This server hardware/software solution allows attached voice memos to be stripped from inbound EMail and redirected to the voicemail box associated with the EMail recipient. This solves the problems associated with privacy concerns. Diverting the reply to voicemail further enhances the utility of the message, as traditional voice message manipulation tools, such as play, rewind, speed-up, forward, etc., may then be applied.

The voice stream is then sent to a central office 48 and into the recipient's voicemail box 50, where the recipient may poll this voicemail response as the recipient would poll any other voicemail message.

Server 36 transmits the EMail reply to which the voice data file was attached as conventional EMail to an EMail network 52, and to conventional EMail client devices, such as PCs, 54. The presence of such an EMail reply may be one notice that the recipient has voicemail in the associated voicemail box.

Referring now to FIG. 2, device 12 is shown in greater detail. It will be appreciated that only those components of device 12 necessary to explain the invention hereof are depicted in the figure. Device 12 received EMail message signal 14, which is routed to a POP3 client 62, and then to a MMI 64, whereupon it is displayed on display 60. Device 12 includes some form of command mechanism, such as a key or voice command, to generate a reply to the displayed EMail message. The reply includes, in the preferred embodiment, a .wav file 66, or other audio file, which is transmitted as an attachment to the reply EMail. The reply is handled by SMTP client 68 and leaves device 12 as voice reply signal 15.

From an implementation standpoint, it is clear that the primary task of the system is modifying SMTP server 36 software portion of the corporate EMail gateway and implementing lookup table function 40 to allow the EMail-to-voicemail conversion. Specific algorithms and/or protocols are required to exchange the voice data file content with the voicemail server. Taking a least common denominator approach, it may be assumed that interface 42 to the voicemail system will be through a plain old telephone system (POTS) interface with dual tone multi frequency (DTMF) signaling. The voicemail interface hardware may then be little more than a data access arrangement (DAA), which may be controlled by software on the corporate EMail server. More powerful voicemail systems may allow varying degrees of network connectivity such that the interface hardware function is unnecessary. Some voicemail systems already have IP access for administration purposes, such as provisioning, extracting call records, etc.

The invention includes server hardware and software which performs the following functions:

(1) monitor the arrival of inbound EMail messages;

(2) identify embedded voice memo components;

(3) convert said voice memo component to a format suitable for transfer to voicemail server;

(4) lookup voicemail box number using destination EMail address as a key;

(5) initiate session with voicemail server; and (6) transfer converted voice memo to voicemail system.

Although a preferred embodiment of the system and method of the invention have been disclosed herein, it will be appreciated that farther variations and modification may be made thereto without departing from the scope of the invention as defined in the appended claims.

I claim:

1. A system for providing a voice response to an EMail message, wherein the voice response is generated by a user using a thin client device which is subscribed to a cellular service, wherein the voice response is transmitted to the cellular service and then to a world-wide communications network, comprising:

a conversion mechanism in the thin client device for converting the voice response into a voice data file which is transmitted over the world-wide communications network;

an EMail server connected to the world-wide communications network for receiving conventional EMail and said voice data file;

an EMail-to-voicemail gateway for identifying said voice data file;

a voicemail interface for receiving said voice data file from said EMail-to-voicemail gateway and converting said voice data file into a voice stream;

a voicemail system, including recipient voicemail boxes; for directing said voice stream into a recipient's voicemail box.

2. The system of claim 1 which includes a lookup table for correlating a recipients voicemail box address with a recipient's EMail address.

3. The system of claim 1 wherein the conversion mechanism includes an attaching mechanism for attaching said voice data file to a reply EMail message thereby making an attached voice data file.

4. The system of claim 3 wherein said EMail server includes a splitting mechanism for splitting said attached voice mail data file from said EMail reply message.

5. The system of claim 1 wherein said EMail-to-voicemail gateway is located in said EMail server.

6. A method of generating a voicemail message by a user using a thin client device and transmitting that voicemail message over an EMail system, comprising:

sending a voice mail message over a wireless phone system;

converting the voice mail message into a voice data file;

transmitting the voice data file over a world-wide communications network;

receiving the voice data file at an EMail server;

separating the voice data file from EMail files;

changing the voice data file into a voice stream; and directing the voice stream to a recipient's voicemail box.

7. The method of claim 6 wherein said transmitting includes transmitting the voice data file as an attachment to an EMail message.

8. The method of claim 7 wherein said separating includes using a lookup table to locate a recipient's voicemail box address from a recipient's EMail address.

9. The method of claim 7 wherein said transmitting includes transmitting a voice message as an EMail message.

10. A method of transmitting a voice message attached to an EMail message over a world-wide communications network as a voice data file, including:

generating a voicemail message by a user using a thin client device;

sending a voicemail message over a wireless phone system;

converting the voicemail message into a voice data file; and directing the voice data file to a recipient's voicemail box.

11. The method of claim 10 wherein a voicemail server is connected to the world-wide communications network.

12. The method of claim 10 which includes separating the voice data file from the EMail message and converting the voice data file to a voice stream for storage in the recipient's voicemail box.

13. The method of claim 10 which includes converting the voice data file to a voice stream for storage in the recipient's voicemail box.

* * * * *